United States Patent
Lewis

(10) Patent No.: US 7,005,066 B2
(45) Date of Patent: Feb. 28, 2006

(54) TRASH TRAP FOR LIQUID MANURE DISPOSAL SYSTEMS

(75) Inventor: Larry D. Lewis, 3045 Snyder Ave., Cedar, IA (US) 52543

(73) Assignee: Larry D. Lewis, Cedar, IA (US)

( * ) Notice: Subject to any disclaimer, the term of this patent is extended or adjusted under 35 U.S.C. 154(b) by 270 days.

(21) Appl. No.: 10/347,925

(22) Filed: Jan. 20, 2003

(65) Prior Publication Data

US 2003/0136721 A1    Jul. 24, 2003

Related U.S. Application Data

(60) Provisional application No. 60/350,602, filed on Jan. 22, 2002.

(51) Int. Cl.
*B01D 35/28* (2006.01)

(52) U.S. Cl. .................... 210/238; 210/251; 210/435; 210/454; 119/450

(58) Field of Classification Search ............. 119/447, 119/450; 210/251, 238, 442, 435, 237, 234, 210/454, 470, 447, 463, 460
See application file for complete search history.

(56) References Cited

U.S. PATENT DOCUMENTS

| | | | | |
|---|---|---|---|---|
| 142,711 | A | * | 9/1873 | Mase ........................ 210/470 |
| 363,668 | A | * | 5/1887 | Nesbet ...................... 210/238 |
| 922,657 | A | * | 5/1909 | Worsey ...................... 210/234 |
| 1,570,112 | A | * | 1/1926 | Wiley ......................... 210/454 |
| 1,580,065 | A | * | 4/1926 | Merriman ................... 210/238 |
| 1,634,463 | A | * | 7/1927 | Hills .......................... 210/238 |
| 1,665,345 | A | * | 4/1928 | Clade et al. ................ 210/301 |
| 4,124,511 | A | * | 11/1978 | Lay ............................ 210/447 |
| 6,432,305 | B1 | * | 8/2002 | Sumner ...................... 210/232 |

* cited by examiner

Primary Examiner—Terry K. Cecil

(57) ABSTRACT

A trash trap for liquid manure disposal systems that has a cylindrical housing with an open interior. The housing has a first end with an inlet port and an outlet port in its side wall. The cylindrical housing also has a removable cylindrical filter that has a fluid opening in its side walls and is detachably mounted along a centerline of the housing. The cylindrical filter has a diameter that is less than the inner diameter of the housing so that fluid can enter the housing through the inlet port and exit through the outlet port. Also, on the second end of the housing there is a detachable cap around an access opening.

7 Claims, 4 Drawing Sheets

TRASH TRAP FOR LIQUID MANURE DISPOSAL SYSTEMS

CROSS REFERENCE TO RELATED APPLICATION

This is a continuation of Provisional Patent Application No. 60/350,602 filed Jan. 22, 2002.

BACKGROUND OF THE INVENTION

It is common to pump liquid sewage out of pits in hog confinement buildings. A pump in the pit typically agitates the sewage, and them pumps the sewage through various pipes or hoses to either another large holding reservoir, or the tank of a large vehicle or trailer for final disposal purposes.

Hog confinement buildings represent a harsh environment, and foreign materials often are in the pits containing the sewage. Such materials can be parts of feeders, waterers, bones of deceased animals, tools, and various other items that may be moved from the pit as the liquid sewage is pumped therefrom. This debris can clog pipes, discharge valves, and create substantial down-time and damage in the sewage disposal process.

It is therefore a principal object of this invention to provide a trash trap for liquid manure disposal systems which will remove debris from the disposal conduits.

A further object of this invention is to provide a trash trap for liquid manure disposal systems which is durable, easily used, and easily cleaned.

BRIEF SUMMARY OF THE INVENTION

The present invention is a trash trap for liquid manure disposal systems. The trash trap has a cylindrical housing that has an open interior and a first and second ends. The cylindrical housing also has side walls. The first end of the cylindrical housing has an inlet port. An outlet port is located in the side wall of the housing. The cylindrical housing also has a removable cylindrical filter that has a fluid opening in its side walls and is detachably mounted along the centerline of the housing. The cylindrical filter has a diameter that is less than the inner diameter of the housing so that fluid can enter the housing through the inlet port. The smaller diameter also allows the fluid to go through the filter, into a space in the housing between the side walls of the housing and the filter, and finally through the outlet port. Also, there is a detachable cap on a second end of the housing around an access opening. This permits manual grasping of one end of the filter for removal from the housing.

This invention also encompasses a detachable filter for a trash trap that can be disposed through a trash trap opening. The filter has a cylindrical screen that has a first and second ends. The filter also has a detachable cap that engages the cylindrical screen. The detachable cap is formed from a cup that has a mounted handle. The cup mates around the outside of the opening.

DESCRIPTION OF THE PREFERRED EMBODIMENT

Figure 1:
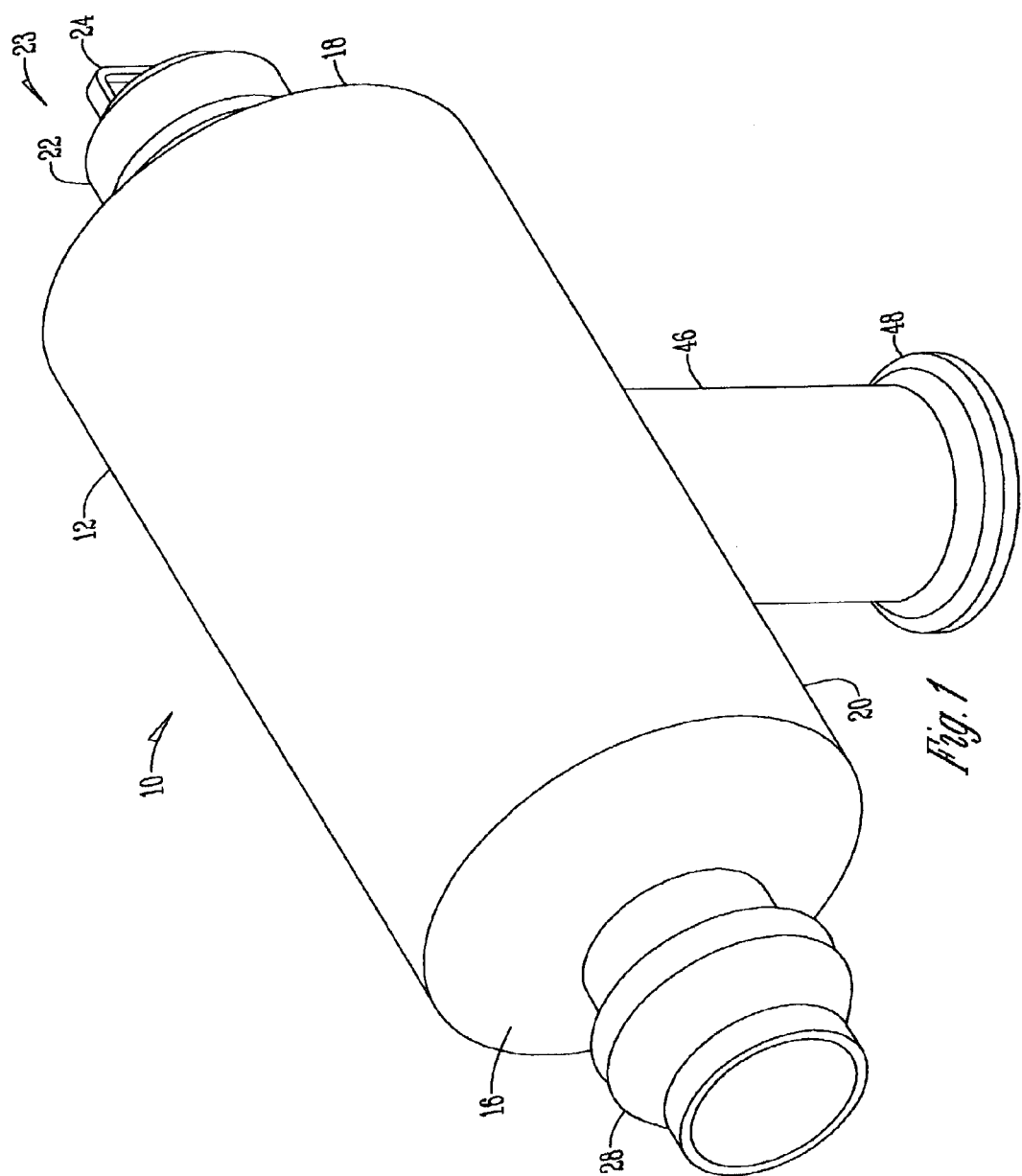
FIG. 1 is a perspective view of the trash trap.
Figure 2:
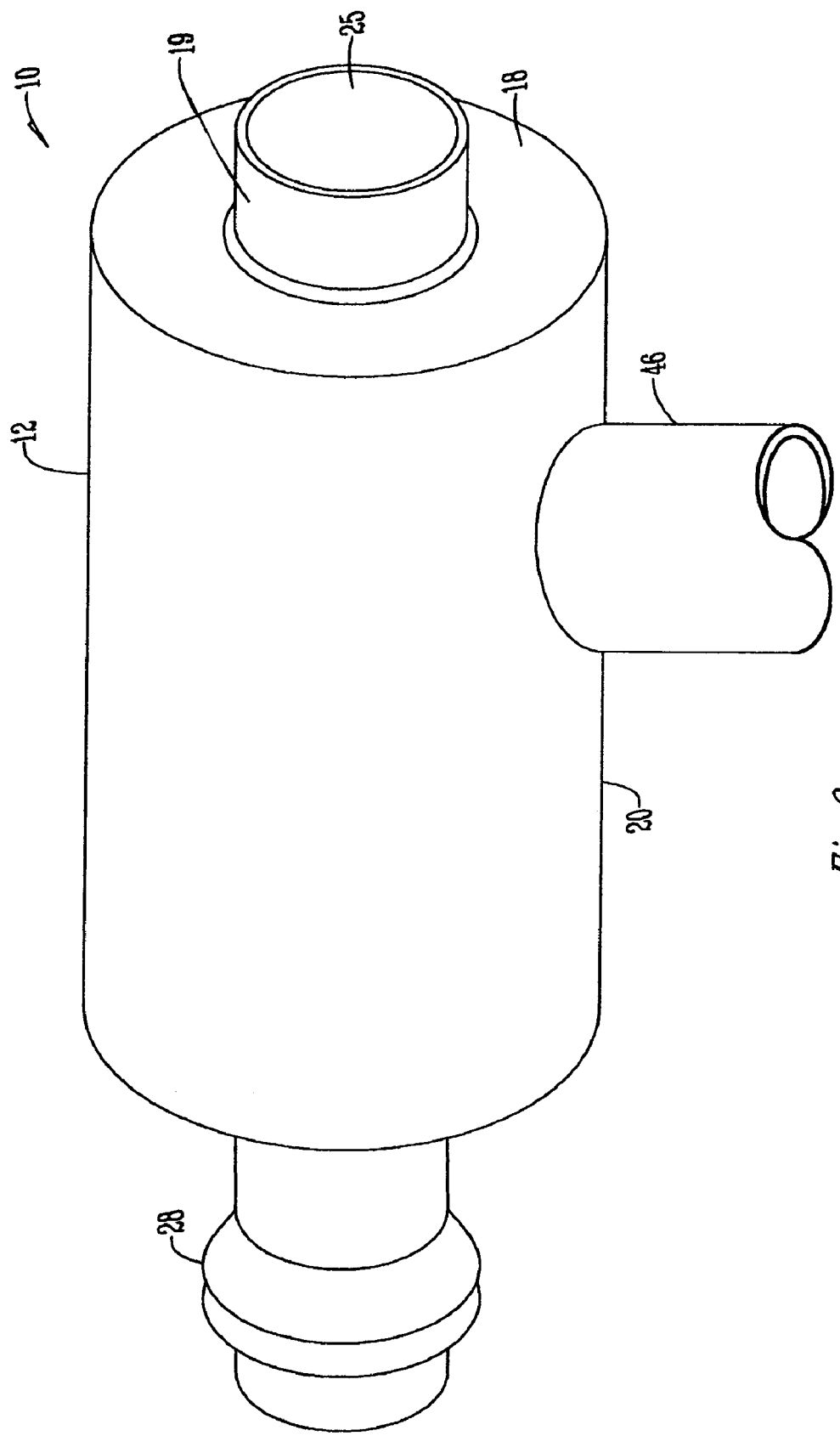
FIG. 2 is an end view thereof with the cap removed.

With reference to FIG. 1, a trash trap 10 comprised of a cylindrical housing 12 has an open interior 14 (see FIG. 4), a first end 16 and a second end 18 having an annular flange 19 (FIG. 2) that extends outwardly from the second end 18. The flange 19 has a diameter that is less than the diameter of the housing 12 and is formed to surround an opening 25. The numeral 20 designates a side wall. A detachable cap 23 with handle 24 and cup 22 is detachably mounted over an opening 25 (FIG. 2) at the second end of the housing. Specifically, the detachable cap is adapted to engage the annular flange 19 in a sealing manner. The cup 22 has an open end, a closed end and a cup sidewall extending therebetween.

Figure 3:
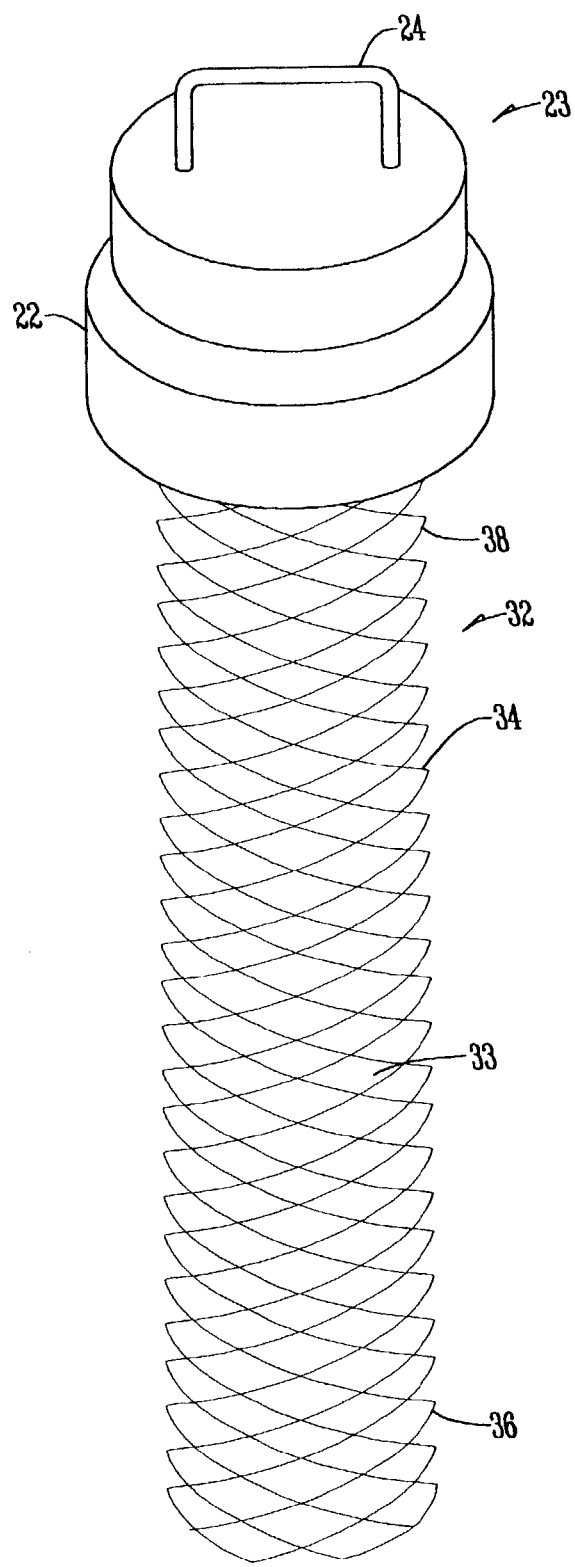
FIG. 3 is a perspective view of the filter with the cap resting thereon.

FIG. 3 presents the detachable filter system. The filter 32 is a cylindrical screen 34 having openings 33. The cylindrical screen 34 has a first end 36 and second end 38. The detachable cap 23 engages the second end 38 of the cylindrical screen 34 helping to support the cylindrical screen 34. Detachable cap 23 is formed from a cup 22 having a mounted handle 24. The cup 22 mates around the second end 18 (FIG. 2) of trash trap 10 by covering the opening 25. The detachable cap 23 allows easy access to the filter 32 when the filter 32 needs to be cleaned or replaced.

Figure 4:
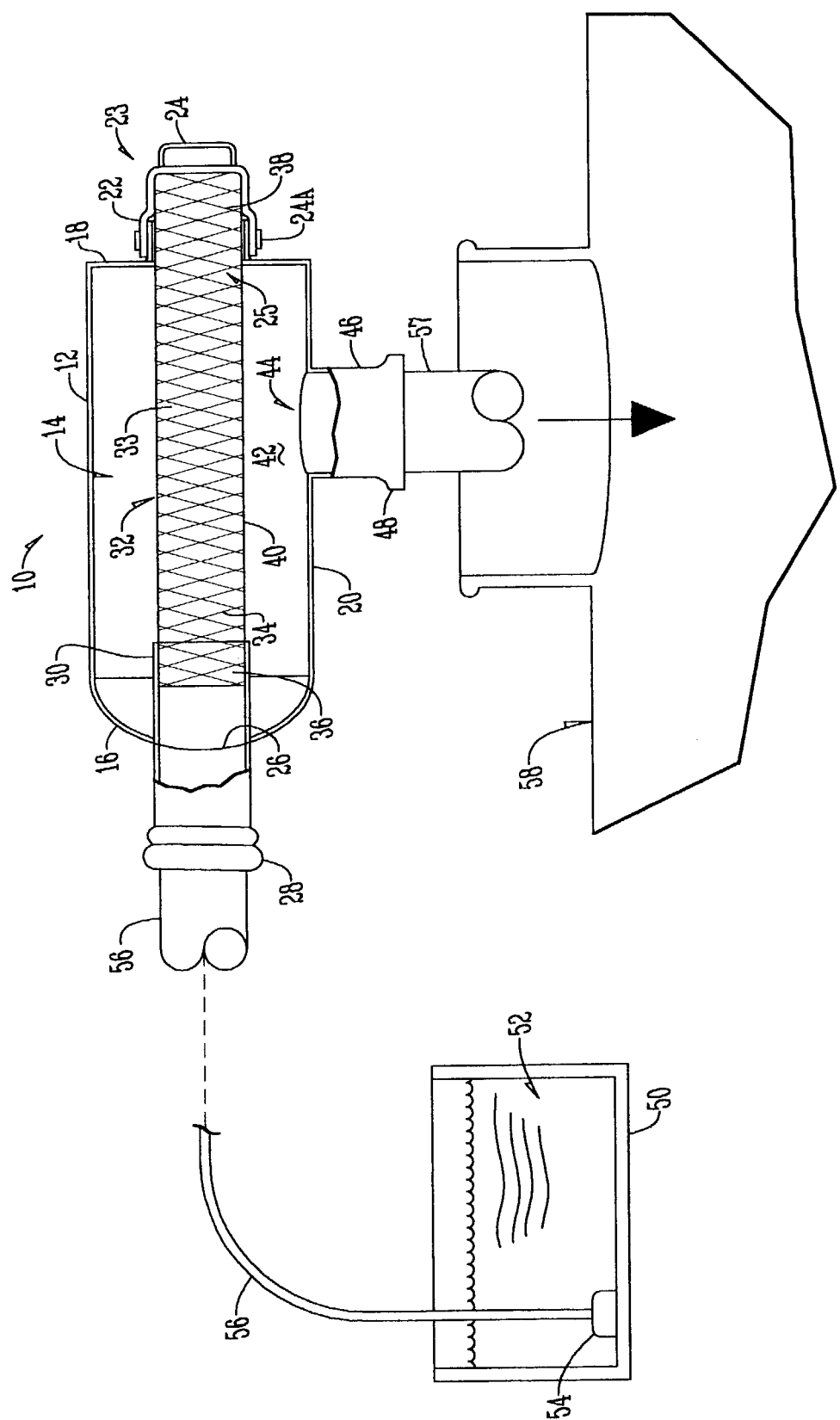
FIG. 4 is a schematic diagram of how the invention is used.

FIG. 4 shows how the trash trap works in operation. An inlet port 26 that is in the first end 16 of the housing 12 has a hose connection 28 connected thereto. A stub tube 30 extends slightly inwardly into the interior 14 of the housing. The filter screen has a length spanning the distance along the interior centerline of the housing and its first end 36 is fitted into stub tube 30, and its second end 38 is fitted into the interior of the cup 22. Thus, the filter is always centered and held against movement within the housing. A space 42 extends around the exterior of the filter and spans the distance between the filter and the inner interior wall of the housing.

An outlet port 44 is formed in the side wall 20 of the cylinder and a laterally extending tube 46 extends outwardly therefrom. A hose or pipe connector 48 is mounted on the outer end of tube 46.

A conventional manure pit 50 containing fluid sewage 52 has an agitation pump 54 therein. A conduit 56 extends upwardly from the pump and is connected to the hose connection 28. A conduit 57 extends between the hose connector 48 and the vehicle tank 58 into which the sewage is to be deposited. The conduit can be connected to tank 58 with a conventional pressure connection if the tank 50 is equipped to spray the liquid sewage over a grooved surface.

The liquid sewage 52 is pumped from pump 54 upwardly through conduit 56, thence through inlet port 26 and into the interior of the filter 32. The fluid flows through openings 33 in the filter into the space 42 around the filter, and thence outwardly through tube 46 and conduit 57 into the vehicle tank 58. Thus, all the incoming fluid will go through filter 32 to sort out any debris which is retained in filter 32 as fluid entering the filter exits the openings 33 in the filter as it moves into the space 42, and thence through the outlet port 44.

The filter can be cleaned by releasing the seal band 24A and removing cup 22 from the end 18 of the housing 12. The filter 32 can then be pulled longitudinally through opening 25 and the debris can be removed therefrom, whereupon the filter can be replaced along with the cup 22.

It is therefore seen that this invention will achieve at least all of its stated objectives.

I claim:

1. A trash trap for liquid manure disposal systems comprising:

a cylindrical housing having an open interior, a cylindrical sidewall and first and second ends attached to respective ends of said cylindrical sidewall;

said first end including an inlet port and a stub tube extending through said inlet port and into said open interior;

an outlet port in the sidewall of the housing;

said second end including an access opening and an annular flange extending outwardly from said second end about said access opening, said flange having a diameter less than the diameter of the cylindrical sidewall;

a detachable cup-shaped cap having a closed end, an open end, and a cup sidewall extending between the closed end and open end, said cup sidewall mounted to an outer surface of said flange;

a removable filter comprising a cylindrical screen having openings therethrough, said screen having a first screen end mounted within said stub tube and a second screen end extending beyond said housing second end and into said cap such that said cup closed end and said cup sidewall contacts said second screen end;

the diameter of the filter being less than the inner diameter of the housing such that fluid can enter the housing through the inlet port, thence through the filter, thence into a space in the housing between the cylindrical sidewall of the cylindrical housing and the cylindrical screen, and thence through the outlet port; and said detachable cap permitting manual grasping of the filter for removal thereof from the housing.

2. The trash trap of claim 1, wherein the inlet port is fluidly connected to a manure pit and the outlet port is fluidly connected to a vehicle tank.

3. The trash trap of claim 1, wherein the filter is detachably mounted along a centerline of the housing.

4. The trash trap of claim 1 further comprising a hose connector around the inlet port.

5. The trash trap of claim 1 further comprising a hose connector around the outlet port.

6. The trash trap of claim 1 further comprising a handle mounted to the detachable cap.

7. The trash trap of claim 6 further comprising a seal band secured to the detachable cap.

* * * * *